(12) United States Patent
Zhao et al.

(10) Patent No.: US 11,446,749 B2
(45) Date of Patent: Sep. 20, 2022

(54) MULTI-FUNCTIONAL ENGINEERING ATTACHMENT FOR CLAMPING, CUTTING, AND GRASPING WITH A SINGLE DEGREE OF FREEDOM VARIABLE TOPOLOGY MECHANISM

(71) Applicant: Beijing University of Technology, Beijing (CN)

(72) Inventors: Jing Zhao, Beijing (CN); Hao Zhang, Beijing (CN); Ziqiang Zhang, Beijing (CN); Tong Wu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 274 days.

(21) Appl. No.: 16/483,036

(22) PCT Filed: Feb. 20, 2019

(86) PCT No.: PCT/CN2019/073105
§ 371 (c)(1),
(2) Date: Aug. 1, 2019

(87) PCT Pub. No.: WO2019/154109
PCT Pub. Date: Aug. 15, 2019

(65) Prior Publication Data
US 2021/0354216 A1  Nov. 18, 2021

(30) Foreign Application Priority Data
Feb. 6, 2018 (CN) .......................... 201810117681.8

(51) Int. Cl.
*B23D 15/14* (2006.01)
*B25J 15/00* (2006.01)

(52) U.S. Cl.
CPC .......... *B23D 15/14* (2013.01); *B25J 15/0028* (2013.01)

(58) Field of Classification Search
CPC . B25J 15/022; B25J 15/08; B25J 19/02; B25J 13/06; B25J 19/023; B23D 15/00;
(Continued)

(56) References Cited

U.S. PATENT DOCUMENTS

| | | | |
|---|---|---|---|
| 3,918,476 A * | 11/1975 | Jasinski | ................... B26D 1/30 144/34.5 |
| 4,376,340 A * | 3/1983 | Ramun | ................... B23D 17/00 144/34.5 |

(Continued)

FOREIGN PATENT DOCUMENTS

| CN | DN104972477 A | 10/2015 |
|---|---|---|
| CN | 108356345 A | 8/2018 |

(Continued)

*Primary Examiner* — Ghassem Alie
(74) *Attorney, Agent, or Firm* — Leonid Kisselev

(57) ABSTRACT

The invention discloses a clamping-cutting-grasping multi-functional engineering attachment applying single-degree-of-freedom shape-shifting mechanism, with a symmetrical structure, including a clamping and cutting device, a grasping device, and a separating and deforming device, and further includes two hydraulic cylinders, one base, two separation bases, a driving hydraulic cylinder, hydraulic scissors, a grasping connecting rod, a grasping claw, a separating connecting rod, a base guide rod, a base slider, a separating slider, first connecting rod, second connecting rod and separation slider track groove. The invention uses a double slider mechanism to achieve the relative movement between the grasping device versus the clamping and shearing device, and also realizes a fast conversion from clamping and cutting device to the grasping device, all the work requirements being satisfied under each working state without motion interference.

3 Claims, 11 Drawing Sheets

(58) Field of Classification Search
CPC .......... B23D 33/00; B23D 15/14; B26D 1/06; B26D 7/02; B26D 5/12; B26D 1/08; Y10T 83/7487
USPC .... 83/375, 452, 609, 694, 928; 30/131, 134, 30/225, 228, 233
See application file for complete search history.

(56) References Cited

U.S. PATENT DOCUMENTS

| | | | |
|---|---|---|---|
| 5,052,680 | A | 10/1991 | Malewicki et al. |
| 5,704,560 | A * | 1/1998 | Wimmer ................. E02F 3/965 241/101.73 |
| 7,467,450 | B2 * | 12/2008 | Rygol .................... B42C 19/08 198/621.1 |
| 8,727,252 | B1 * | 5/2014 | Phipps ................... E02F 3/965 241/101.73 |
| 9,770,829 | B2 * | 9/2017 | Zhao ...................... B25J 15/08 |
| 11,142,884 | B1 * | 10/2021 | Ramun .................. E02F 3/404 |
| 2011/0044786 | A1 * | 2/2011 | Marsh .................... B26D 1/08 412/1 |
| 2013/0186246 | A1 * | 7/2013 | Franze ................... B26D 5/12 83/452 |

FOREIGN PATENT DOCUMENTS

| | | | |
|---|---|---|---|
| EP | 0947295 | B1 | 12/1999 |
| JP | 3442292 | B2 | 9/2003 |

\* cited by examiner

MULTI-FUNCTIONAL ENGINEERING ATTACHMENT FOR CLAMPING, CUTTING, AND GRASPING WITH A SINGLE DEGREE OF FREEDOM VARIABLE TOPOLOGY MECHANISM

CROSS REFERENCE TO RELATED APPLICATION

This application is a national stage application of International application number PCT/CN2019/073105, filed Feb. 20, 2019, titled "A Multi-functional Engineering Attachment for Clamping, Cutting, and Grasping With A Single Degree Of Freedom Variable Topology Mechanism," which claims the priority benefit of Chinese Patent Application No. 201810117681.8, filed on Feb. 6, 2018, which is hereby incorporated by reference in its entirety.

TECHNICAL FIELD

The invention relates, in general, to the field of the field of mechanical design and hydraulic control technique during earthquake relief, and in particular to a multi-bar multi-functional engineering attachment.

BACKGROUND

In recent years, frequent earthquake disasters have inflicted damages on economy buildup and safety of people's lives and property. Therefore, the use of efficient post-earthquake disaster relief equipment has great significance for carrying out demolition work in the disaster area. As shown from recent earthquake relief and rescue efforts, hydraulic crushing pliers, and stone-grasping tools play important roles in the demolition work of the rescue and relief efforts. Therefore, the realization of a multi-purpose machine for the post-disaster demolition work and economic construction has extremely important practical significance. At present, a dual-arm structure is usually adopted to achieve multi-function operation by the same rescue equipment, that is: a single robotic arm is equipped with a single attachment for operation. This scheme has the disadvantages such as inconvenient operation, difficult manufacturing and high cost. Therefore, there remains the needs to design a new type of attachment with multiple functions.

SUMMARY

The object of the present invention is to realize an attachment that has crushing, cutting and grasping function. Overcoming technical obstacles, a variety of functions is realized in one attachment, with a reasonable design.

The present invention disclosed a multi-functional engineering attachment for clamping, cutting and grasping with single degree-of-freedom (DOF) variable topology mechanism comprising: two hydraulic cylinders (1), a base (2), two separating bases (3), a driving hydraulic cylinder (4), a hydraulic scissors (5), a grasping connecting rod (6), a grasping claw (7), a separating connecting rod (8), a base guide rod (9), a base slider (10), a separating slider (11), a first connecting rod (12), a second connecting rod (13) and a separating slider track groove (14).

The overall appearance of the hydraulic scissors (5) is a triangular plate structure with teeth on one side, wherein the three angles are referenced as A, B and C for illustration purpose, the sideline connecting the angle A and the angle C has teeth. The overall appearance of the structure of the grasping claw (7) is a triangular plate with three angles referenced as A, B and C, wherein the angle C has a hook as the tip of the claw. The hydraulic scissors (5) and the grasping claw (7) are matched in pairs.

The axial directions of the two hydraulic cylinders (1) are arranged in a plane in parallel, one end of one hydraulic cylinder is staggered opposite to one end of the other hydraulic cylinder, wherein the two staggered opposite ends are respectively fixed with the upper part of the separating bases (3), the other ends of the two hydraulic cylinders (1) are fixed onto the base (2), During working state, the two hydraulic cylinders (1) push the two separating bases (3) to move along the axes of two hydraulic cylinders (1) respectively, two separating bases (3) move in opposite directions;

Assigning the left and right axial directions of the two hydraulic cylinders (1) as the direction of the X axis, vertical direction as the Y-axis direction, and a direction perpendicular to the X-axis and Y-axis as the Z-axis, which is also the axial direction of multi-functional engineering attachment for clamping, cutting and grasping; thereafter, the separating bases (3) are arranged symmetrical along the Y-axis, the lower ends of the separating bases (3) have a triangular deletion along the Z-axis, and the middle and lower parts of the separating base (3) have grooves on two sides along the X axis.

For the structure along the X-axis side, the lower part of the separating bases (3) have a through hole along the z-axis direction, and the first connecting rod (12) is installed in the through hole and parallel to the Z-axis, the bottom grooves of the separating bases (3) are connected to angle A of the hydraulic scissors (5) by means of a hinge, respectively, the hinge between the separating base (3) and the hydraulic scissors (5) angle A is lower than the first connecting rod (12) in Z-axis direction. The groove in the middle part of the separating bases (3) is fixed to one end of the driving hydraulic cylinder (4), the other end of the driving hydraulic cylinder (4) is connected to angle B of the hydraulic scissors (5) by means of a hinge. The separation bases (3), the driving hydraulic cylinder (4) and the hydraulic scissors (5) constitute a three-bar structure. The first connecting rod (12) outside the Z-axis direction of separating base (3) is connected by a hinge with angle A of the grasping claw (7) through the separating connecting rod (8), the separating slider (11) is provided protruding from the outside the angle A of the grasping claw (7) along the direction of Z axis, the separating slider (11) is located inside of the vertical and rectangular separating slider track groove (14), the separating slider (11) can slide up and down, and the separating slider track groove is fixed to the base (2). A through hole is provided in the grasping claw (7) angle B along the Z-axis, the second connecting rod (13) is installed through the through hole. The second connecting rod (13) is parallel to Z-axis, and the grasping connecting rod (6) is adopted to connect the hydraulic scissors (5) angle B and the second connecting rod (13). The hydraulic scissors (5) angle B and the grasping connecting rod (6) are connected by hinge, the second connecting rod (13) is rotatably connected to the grasping connecting rod (6).

The base slider (10) is fixed onto and protrudes from the outer side and along Z-axis of the separating base (3), a through hole is installed in the inner part of the base slider (10) along the X-axis. The base guide rod (9) is installed through the through hole and is parallel to X-axis. The two ends of the base guide rod (9) are fixed on the base (2).

The grasping claw (7) is a multi-pair grasping claw parallel to the Z-axis.

The multi-functional attachment is equipped with a clamping and cutting device A, a grasping device B, and a separating and deforming device C.

When the attachment functions as the clamping and cutting device A, the separating bases (3) are integrated with the base (2), at the same time, the separation bases (3) function as a frame and forms a four-bar mechanism with the driving hydraulic cylinder (4) and hydraulic scissors (5). The driving hydraulic cylinder (4) provides power and drives the hydraulic scissors (5) to achieve the function of cutting and crushing.

When the attachment functions as the grasping device B, the separating slider (11) and the separating bases (3) are integrated with the base (2), which are regarded or function as a frame; at the same time, the driving hydraulic cylinder (4) provides the driving force, with the help of the rotation of the hydraulic scissors (5), with the hydraulic scissors (5) and the grasping claw (7) as the frame connecting rod, with the grasping connecting rod (6) as connecting rod, a four-bar mechanism is formed to drive the grasping claw (7) to achieve the grasping function.

When the attachment functions as the separating and deforming device C, the driving hydraulic cylinder (4) needs to be locked, that is, the clamping and cutting device A is a component: the hydraulic cylinder (1) is used as the driver during the separation deformation, the separating and deforming device C is a double slider mechanism.

The change of the position of two sliders causes changes in the configuration of the four-bar mechanism with the hydraulic scissors and the grasping claw as frame connecting rod, and the grasping claw as the connecting rod, achieving the conversion among the crushing function, cutting function and grasping function.

That is, through the deformation of the double slider, the size and posture of a component of the four-bar mechanism are changed, so that the four-bar mechanism has a different configuration after the deformation, and under the drive of the same original moving parts, different motion outputs can be achieved, namely the cutting/shearing and crushing state, and the grasping state.

The Beneficial Effects of the Invention are as Follows:

The invention uses only one attachment to realize the functions of crushing, cutting/shearing and grasping, and retains the original labor-saving structure of hydraulic crushing forceps.

The invention uses a double slider mechanism to realize the relative movement of the grasping device B and the clamping and cutting device A. The invention can quickly effect the transition from the clamping and cutting device A to the grasping device B, and meet the work requirements under each working state without motion interference.

The invention adopts a design of self-locking working states that increases the stability and reliability.

This scheme has high integration, simple structure and is easy to operate, and there is no similar scheme in the previous equipment design.

Figure 1:
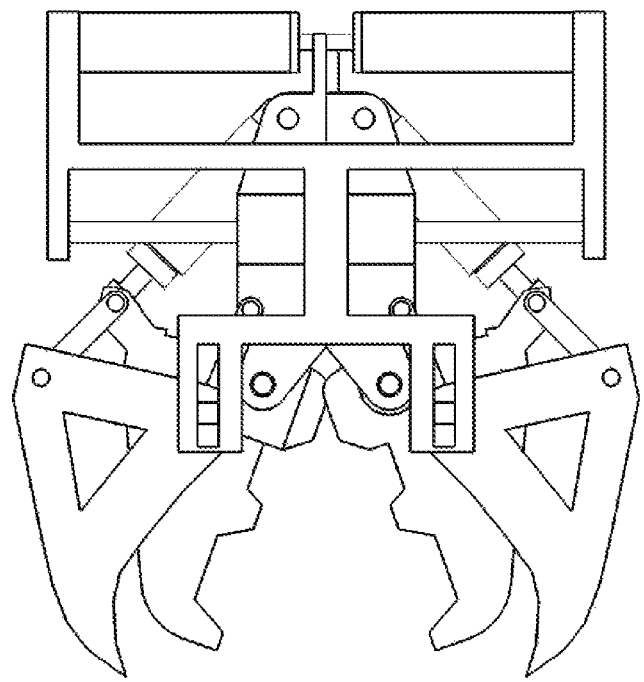
FIG. 1 is a diagram showing 3D front view of the entire assembly, according to one embodiment.

Wherein 1. Hydraulic cylinder 2.Base 3.Separating bases 4. Driving hydraulic cylinder. 5.Hydraulic scissor 6.Grasping connecting rod 7.Grasping claw 8.Separating connecting rod 9.Base guide rod 10.Base slider 11.Separating slider 12.First connecting rod. 13.Second connecting rod. 14.Separating slider track groove.

DETAILED DESCRIPTION OF THE PREFERRED EMBODIMENTS

The specific embodiments are described accompanied with the attached drawings, but the invention is not limited to the following embodiments.

Embodiment 1

Figure 2:
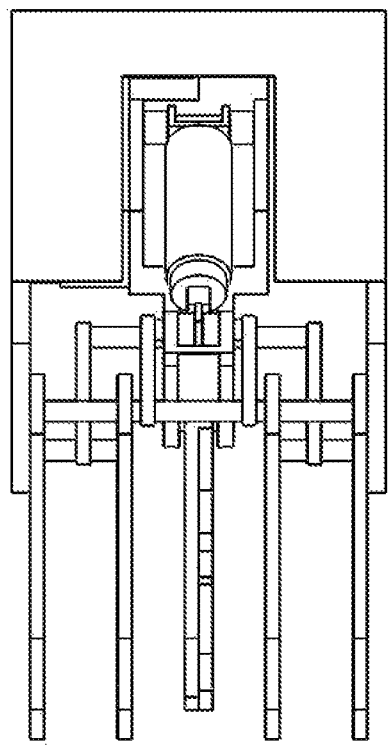
FIG. 2 is a diagram showing 3D side view of the entire assembly, according to one embodiment.
Figure 3:
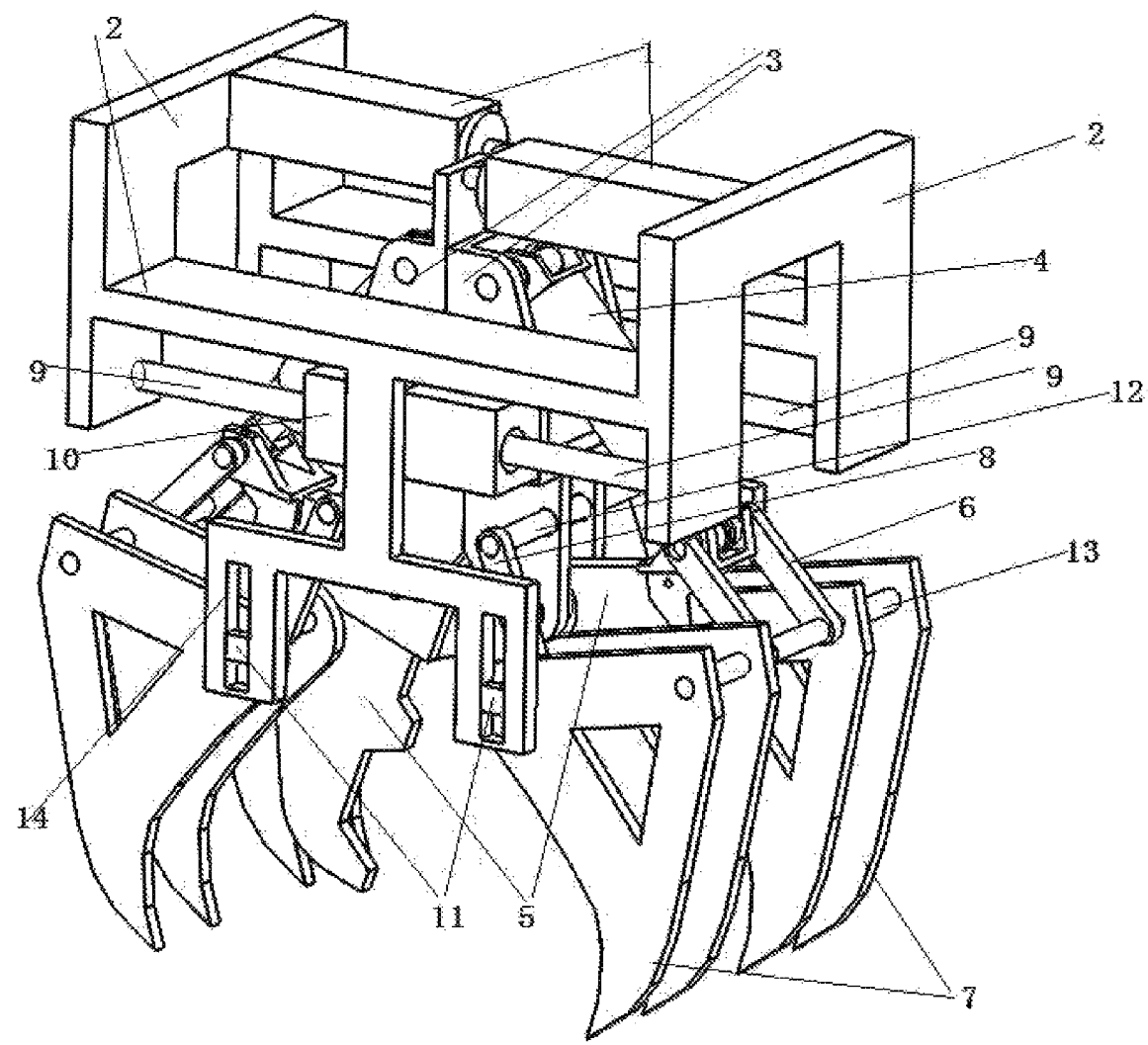
FIG. 3 is a diagram showing 3D axonometric view of the entire assembly, according to one embodiment.

As shown in FIGS. 1, 2 and 3, a type of multi-functional rescue attachment for clamping, cutting and grasping is disclosed, including the clamping and cutting device A, the grasping device B and the separating and deforming device C. the attachment has three kinematic states: cutting and crushing; grasping; separating and deforming.

Figure 4:
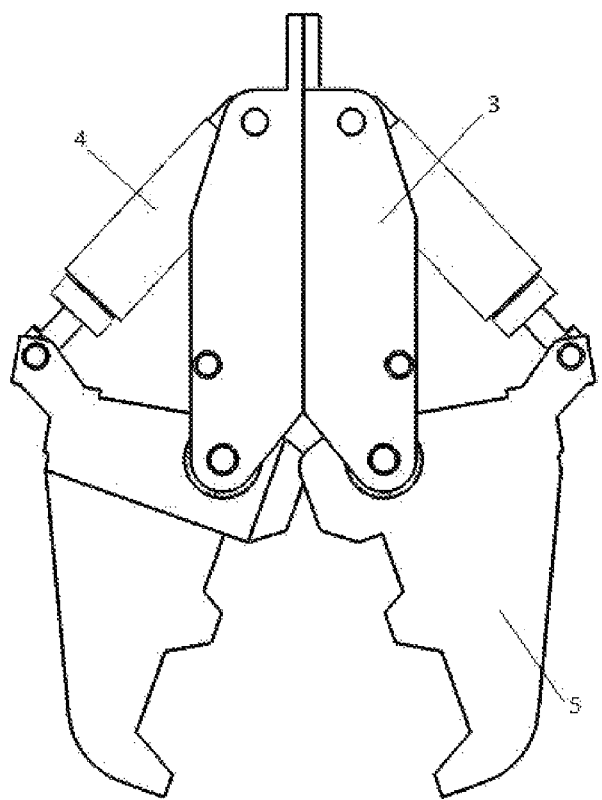
FIG. 4 is a diagram showing front view of the clamping and cutting device, according to one embodiment.
Figure 5:
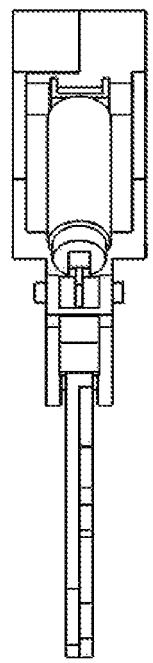
FIG. 5 is a diagram showing side view of the clamping and cutting device, according to one embodiment.
Figure 6:
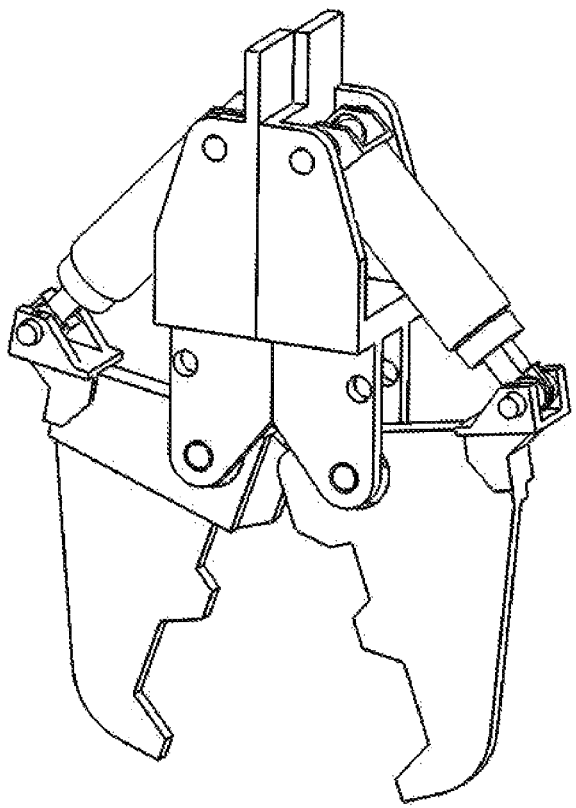
FIG. 6 is a diagram showing axonometric view of the clamping and cutting device, according to one embodiment.
Figure 7:
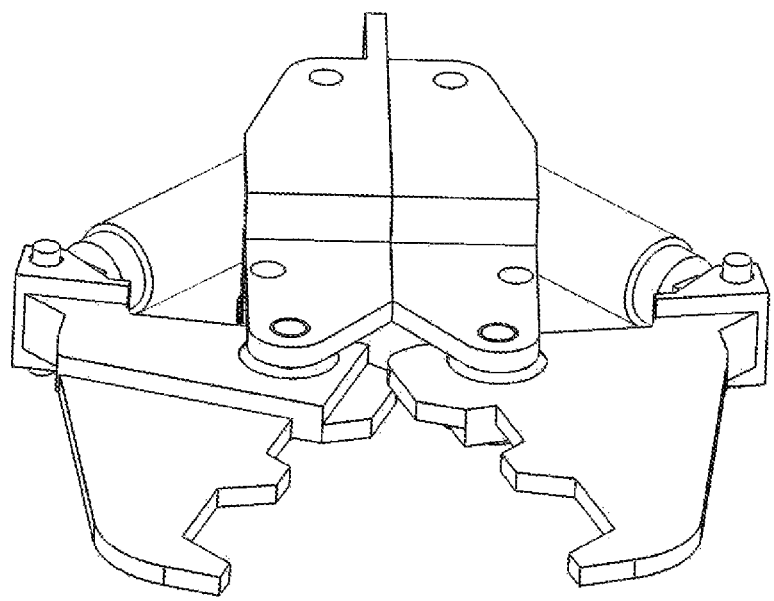
FIG. 7 is a diagram showing details of the clamping and cutting edge, according to one embodiment.
Figure 8:
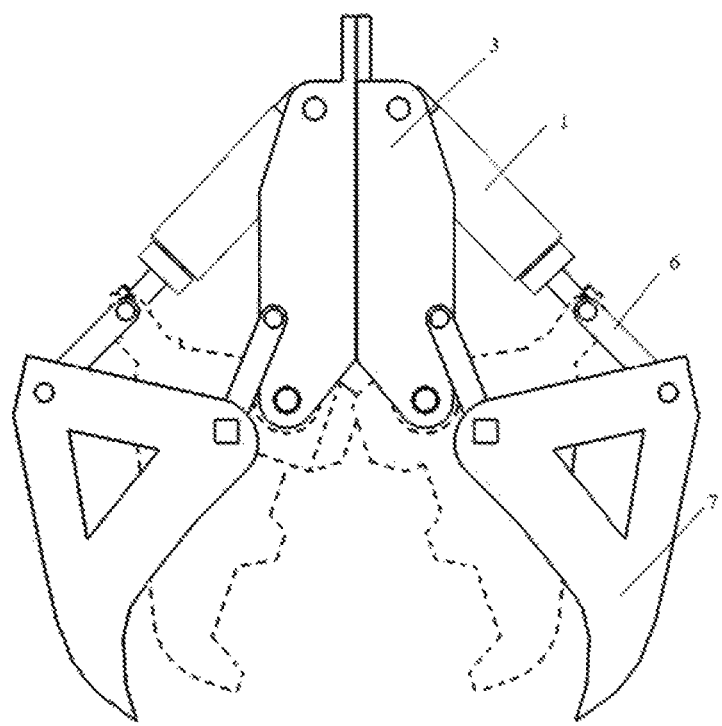
FIG. 8 is a diagram showing front view of the grasping device, according to one embodiment.
Figure 9:
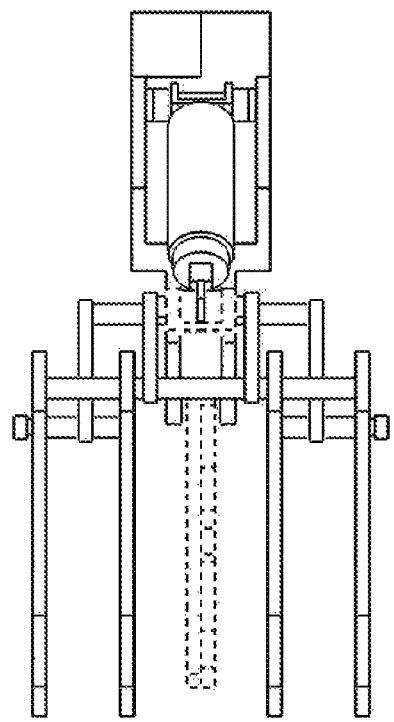
FIG. 9 is a diagram showing side view of the grasping device, according to one embodiment.
Figure 10:
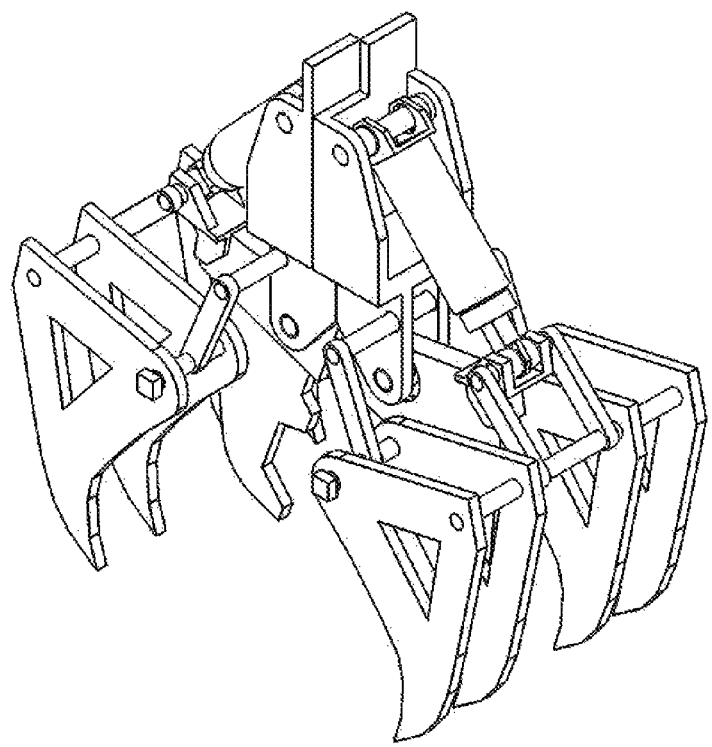
FIG. 10 is a diagram showing axonometric view of the grasping device, according to one embodiment.
Figure 11:
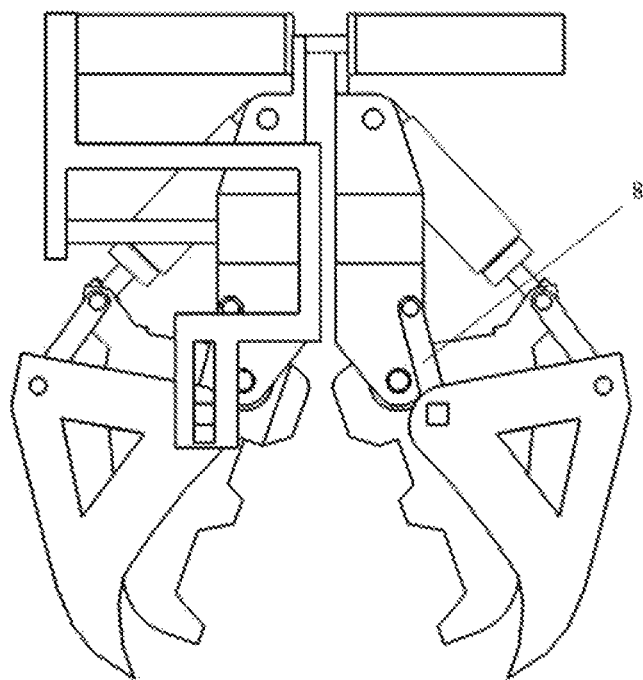
FIG. 11 is a diagram showing front view of the separating and deforming device, according to one embodiment.
Figure 12:
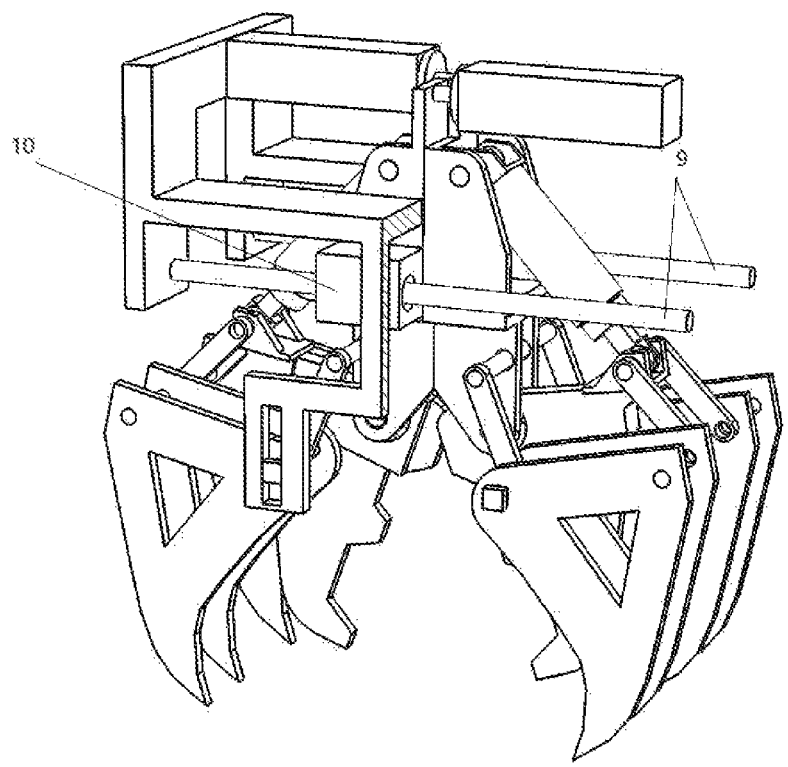
FIG. 12 is a diagram showing axonometric view of the separating and deforming device, according to one embodiment.
Figure 13:
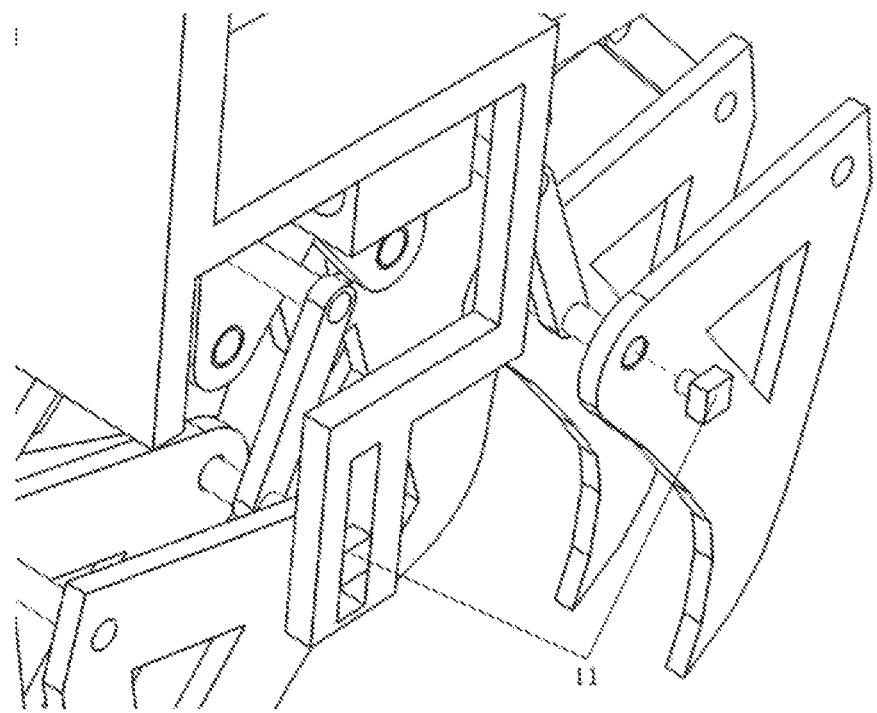
FIG. 13 is a diagram showing details of the separating slider, according to one embodiment.
Figure 14:
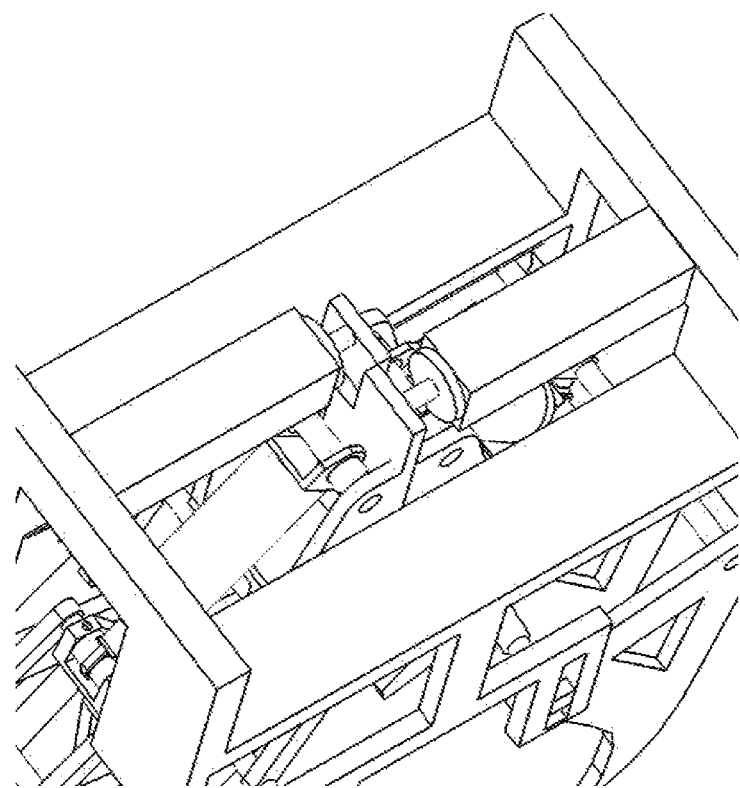
FIG. 14 is a diagram showing details of the hydraulic cylinder, according to one embodiment.
Figure 15:
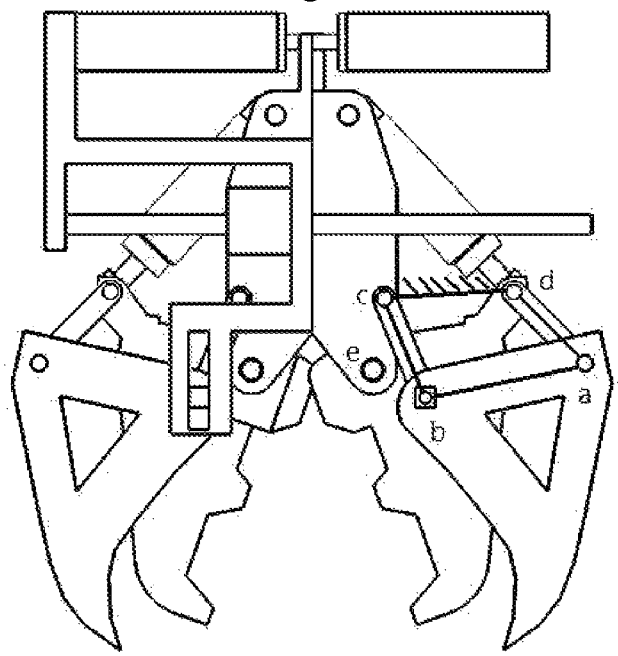
FIG. 15 is a diagram showing the closing state, according to one embodiment.
Figure 16:
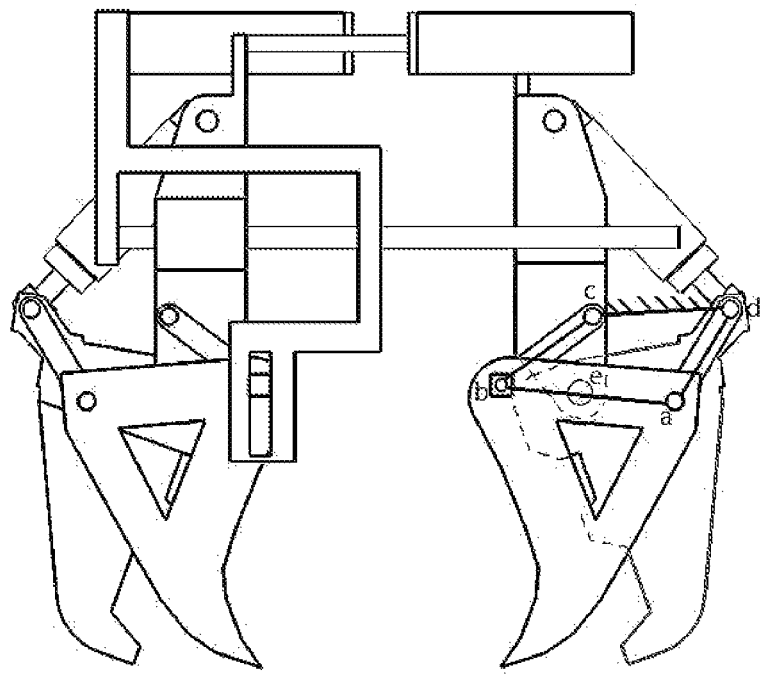
FIG. 16 is a diagram showing the separating state, according to one embodiment.

As shown in FIGS. 15 and 16, the attachment is in the separating and deforming state. When the attachment is under the separating and deforming state, the driving hydraulic cylinder (4) should be locked, based on FIG. 4, the clamping and cutting device A can be considered as a component of the attachment.

Thereupon, the lamping and cutting device A, the separating connecting rod (8), the base (2) and the separating slider (11) constitute a double slider mechanism. As shown in FIGS. 15 and 16, the clamping and cutting device A, separating connecting rod (8), the grasping connecting rod (6) and grasping claw (7) also constitute a "abcd" four-bar mechanism. To facilitate illustration, the base (2) should not be regarded as the frame, instead the clamping and cutting device A can be regarded as the frame. The hydraulic cylinder (1) is pushed out to make the clamping and cutting device A move along the direction of the separating base slider (3). The translation of the base (2) relative to the clamping and cutting device A causes the separating connecting rod (8) to rotate around point c, the rotation of the separating connecting rod (8) causes the "abcd" four-bar mechanism to move. The movement results in a change in the relative position of the grasping claw (7) and the hydraulic scissors (5), that is, the changes of the posture of four-bar mechanism and the length of the "be" components. When the hydraulic cylinder (1) reaches the appropriate position, lock the hydraulic cylinder (1) to complete the separation action. Closing movement is realized by reverse driving direction of the hydraulic cylinder (1). FIG. 15 shows the attachment after the completion of a closing action, and FIG. 16 shows the attachment after completion of a separation action.

Figure 17:
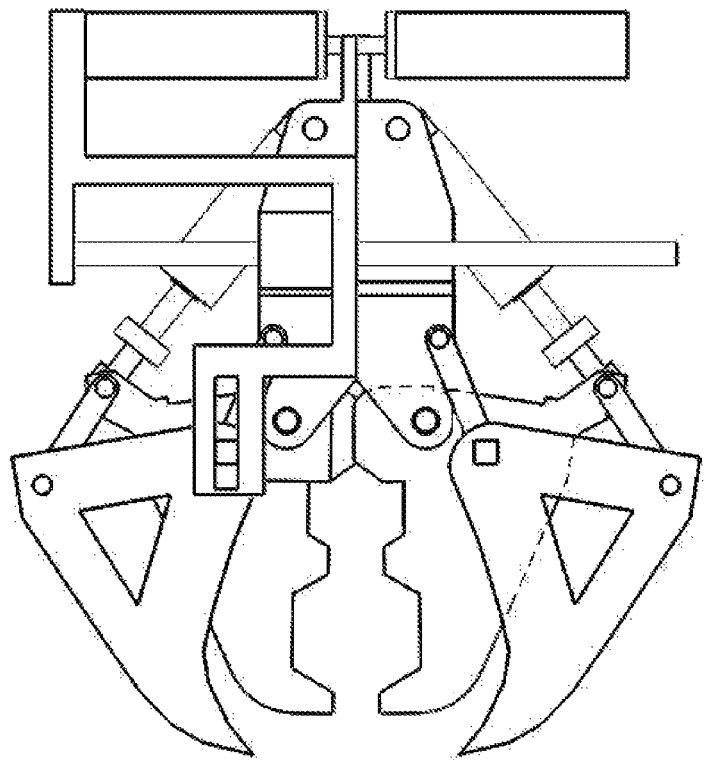
FIG. 17 is a diagram showing working diagram of crushing, according to one embodiment.

As shown in FIGS. 1 and 17, the multi-functional attachment is in the cutting and crushing state. Before cutting and crushing, closing action should be completed and the hydraulic cylinder (1) should be locked. So that the base (2) and the separating base (3) are regarded as a single component of the attachment. The separating bases 3, the driving hydraulic cylinder (4) and the hydraulic scissors (5) constitute a four-bar mechanism. The driving hydraulic cylinder (4) is the power source to push the hydraulic scissors (5) to achieve the function of cutting and crushing.

Figure 18:
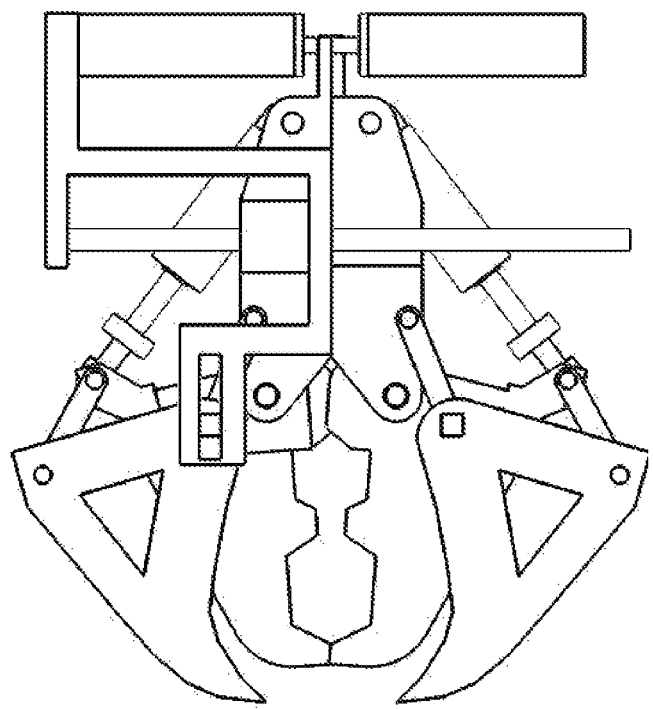
FIG. 18 is a diagram showing working diagram of clamping and cutting, according to one embodiment.

As shown in FIG. 18, the clamping and cutting device A is in the cutting state, cutting is realized by using the cutting edge in the hydraulic scissors (5). As shown in FIG. 1 and 17, the clamping and cutting device A is in the crushing state, crushing is realized by using the jaw in the outer part the hydraulic scissors (5).

Figure 19:
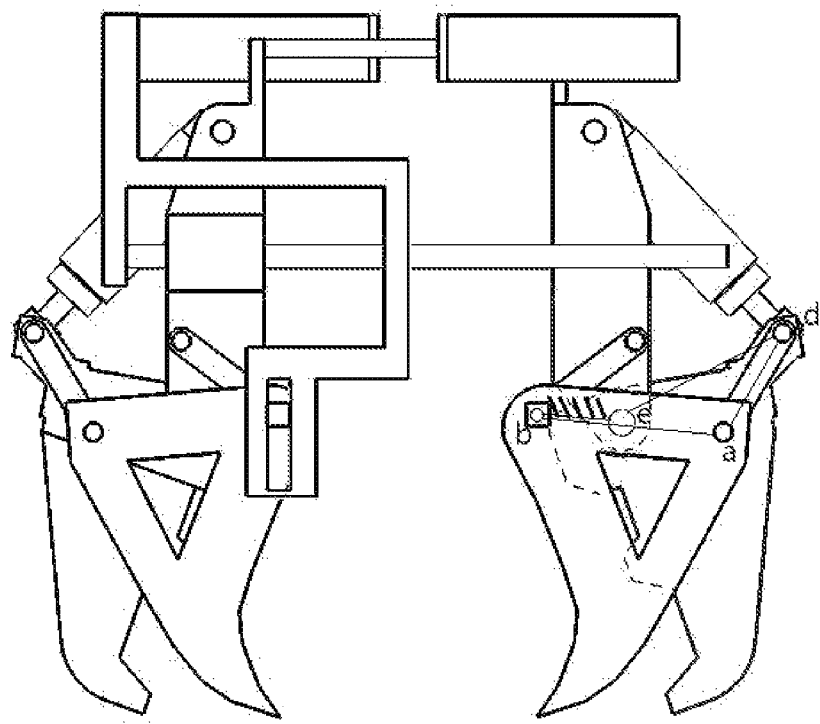
FIG. 19 is a diagram showing Initial working location of grasping, according to one embodiment.
Figure 20:
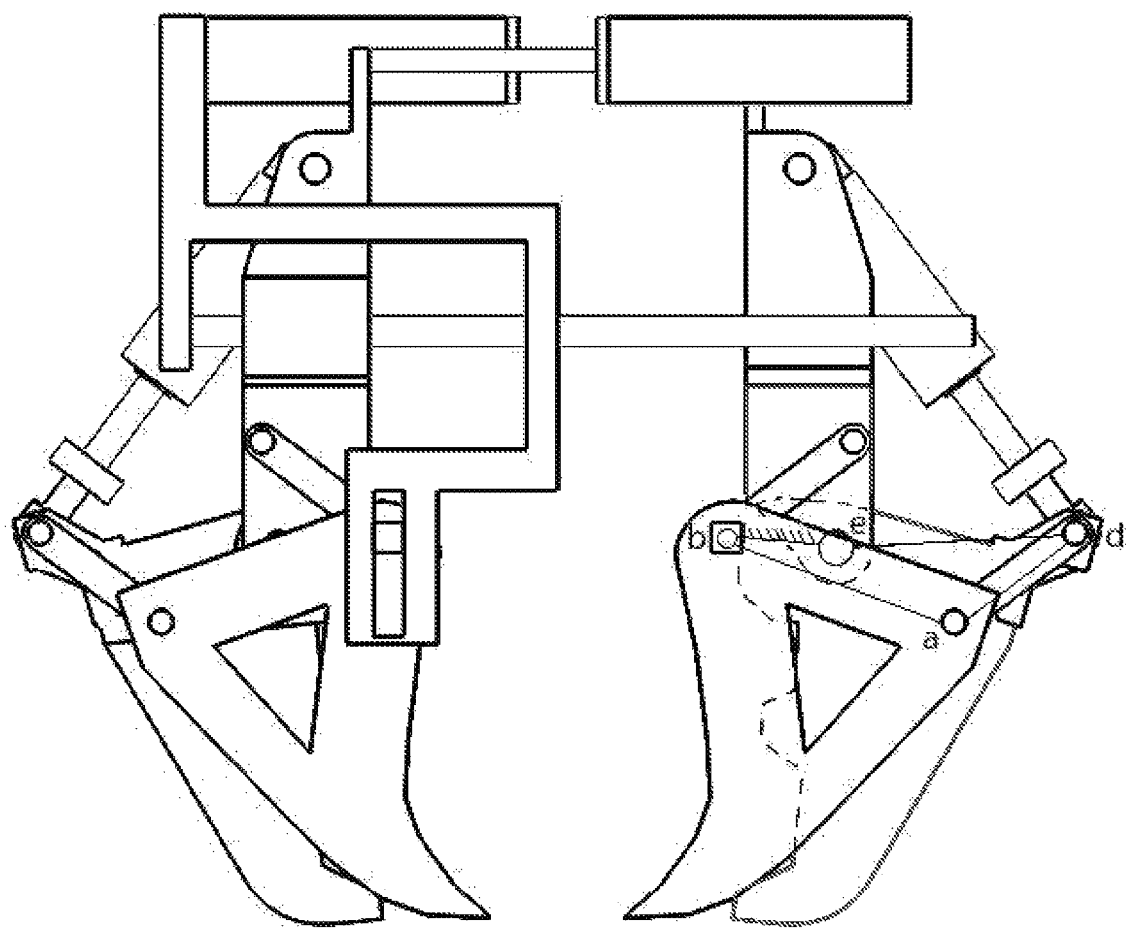
FIG. 20 is a diagram showing working diagram of grasping, according to one embodiment.

As shown in FIGS. 19 and 20, the multi-functional attachment is in the grasping state. Before grasping, the separating action should be completed and the hydraulic cylinder (1) should be locked. Thus, the separating base (3), the separating slider (11) and the base (2) will not move relative to each other. The hydraulic scissors (5), the grasping claw 7 and the grasping connecting rod (6) constitute a "abed" four-bar mechanism. The driving hydraulic cylinder (4) is the main power source to promote the hydraulic scissors (5) to rotate to drive the rotation of the grasping claw (7). That is, the driving hydraulic cylinder (4) pushes the connecting rod "ed" to rotate around point "e", through the transmission of the "abed" four-bar mechanism, the connecting frame bar "ab" rotates around point "b" to achieve the grasping function.

What is claimed is:

1. A multi-functional engineering attachment for clamping, cutting and grasping with single-degree of freedom variable topology mechanism, comprising:

two hydraulic cylinders (1), a base (2), two separating bases (3), two driving hydraulic cylinders (4) that each connect to one of the separating bases (3), hydraulic scissors (5), a grasping connecting rod (6), a grasping claw (7), a separating connecting rod (8), a base guide rod (9), a base slider (10), a separating slider (11), a first connecting rod (12), a second connecting rod (13) and a separating slider track groove (14), wherein an overall appearance of the hydraulic scissors (5) is a triangular plate structure with teeth on one side, and with three corners, wherein a sideline connecting a first one of the corners and a second one of the corners comprises teeth, wherein an overall appearance of the structure of the grasping claw (7) is a triangular plate with additional three corners, wherein first one of the additional corners comprises a hook as a tip of the claw, wherein the hydraulic scissors (5) and the grasping claw (7) are matched in pairs, wherein axial directions of the two hydraulic cylinders (1) are arranged in a plane in parallel, one end of one hydraulic cylinder is staggered opposite to one end of the other hydraulic cylinder, wherein the two staggered opposite ends are respectively attached to upper parts of the separating bases (3), other ends of the two hydraulic cylinders (1) are attached to the base (2), and the two hydraulic cylinders (1) are configured to push the two separating bases (3) to move along the axes of two hydraulic cylinders (1) with the two separating bases (3) moving in opposite directions, wherein a left one and a right one of the axial directions of the two hydraulic cylinders (1) as a direction of the X-axis, a vertical direction is a Y-axis direction, and a direction perpendicular to the X-axis and Y-axis as a Z-axis, which is also an axial direction of multi-functional engineering attachment for clamping, cutting and wherein, thereafter, the separating bases (3) are arranged symmetrical along the Y-axis, lower parts of the separating bases (3) comprise a triangular deletion along the Z-axis, and middle and lower parts of the separating base (3) comprise grooves on two sides along the X-axis;

wherein the lower part of the separating bases (3) comprises a through hole along the Z-axis direction, and the first connecting rod (12) is installed in the through hole and parallel to the Z-axis, the lower part grooves of the separating bases (3) are connected to the first corner of the hydraulic scissors (5) by a hinge, and the hinge between the separating base (3) and the first corner of the hydraulic scissors (5) is lower than the first connecting rod (12) in the Z-axis direction, wherein the groove in the middle part of the separating bases (3) is attached to one end of the driving hydraulic cylinder (4), the other end of the driving hydraulic cylinder (4) is connected to a third one of the corners of the hydraulic scissors (5) by a further hinge, wherein the separating bases (3), the driving hydraulic cylinder (4) and the hydraulic scissors (5) constitute a three-bar structure, wherein the first connecting rod (12) outside the Z-axis direction of the separating base (3) is connected by a hinge with first additional corner of the grasping claw (7) through the separating connecting rod (8), the separating slider (11) is provided protruding from the first additional corner of the grasping claw (7) along the direction of Z-axis, the separating slider (11) is located inside of a vertical and rectangular separating slider track groove (14), the separating slider (11) can slide up and down, and the separating slider track groove is fixed to the base (2);

wherein a through hole is provided in a second one of the additional corners of the grasping claw (7) along the Z-axis, the second connecting rod (13) is installed through the through hole, wherein the second connecting rod (13) is parallel to the Z-axis, and the grasping connecting rod (6) is adapted to connect the third corner of the hydraulic scissors (5) and the second connecting rod (13), wherein the third corner of the hydraulic scissors (5) and the grasping connecting rod (6) are connected by a still further hinge, and the second connecting rod (13) is rotatably connected to the grasping connecting rod (6), wherein the base slider (10) is fixed onto and protrudes from an outer side and along the Z-axis of the separating base (3), a through hole is formed in the inner part of the base slider (10) along the X-axis, and wherein the base guide rod (9) is installed through the through hole and is parallel to X-axis, the two ends of the base guide rod (9) are fixed on the base (2).

2. The multi-functional engineering attachment for clamping, cutting and grasping with single-degree of freedom variable topology mechanism according to claim 1, wherein the grasping claw (7) is a multi-pair grasping claw parallel to the Z-axis.

3. The multi-functional engineering attachment for clamping, cutting and grasping with single-degree of freedom variable topology mechanism according to claim 1, wherein the multi-function attachment is configured to function as a clamping and cutting device, a grasping device, and a separating and deforming device, wherein, when the attachment functions as the clamping and cutting device, the separation bases (3) function as a frame and form a four-bar mechanism with the driving hydraulic cylinder (4) and hydraulic scissors (5), wherein the driving hydraulic cylinder (4) provides power and drives the hydraulic scissors (5) to achieve the function of cutting and crushing, wherein when the attachment functions as the grasping device, the separating slider (11) and the separating bases (3) function as a frame, and at the same time, the driving hydraulic cylinder (4) provides a driving force, with the help of the rotation of the hydraulic scissors (5), with the hydraulic scissors (5) and the grasping claw (7) as the frame connecting rod, with the grasping connecting rod (6) as connecting rod, a four-bar mechanism is formed to drive the grasping claw (7) to achieve the grasping function, wherein when the attachment functions as the separating and deforming device, the clamping and cutting device is a component of the attachment, the hydraulic cylinder (1) is used as the driver during the separation and deformation, the separating and deforming device is a double slider mechanism, and a change of positions of two sliders in the double slider mechanism causes changes in the configuration of the four-bar mechanism with the hydraulic scissors (5) and the grasping claw (7) as the frame connecting rod, and the grasping claw as the connecting rod, achieving a conversion among the crushing function, cutting function and grasping function.

* * * * *